M. BRAUER.
AIR FILTER.
APPLICATION FILED AUG. 4, 1913.
1,094,521.
Patented Apr. 28, 1914.
2 SHEETS—SHEET 1.
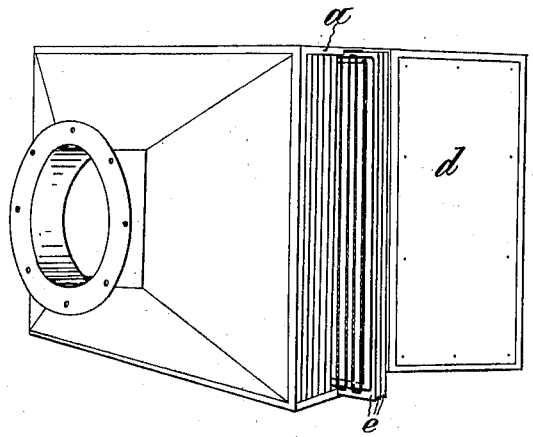
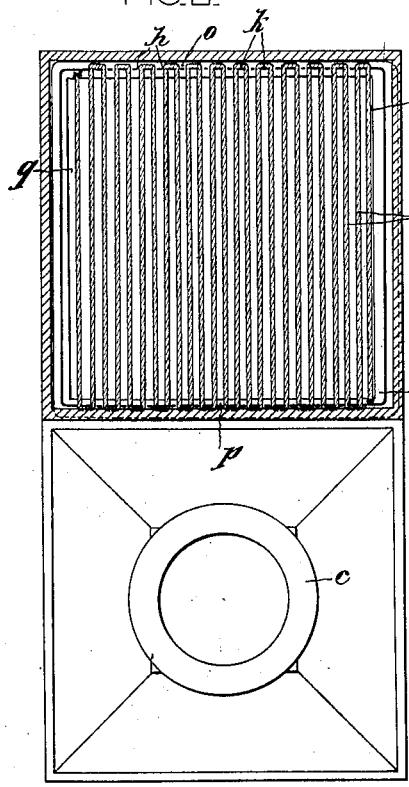
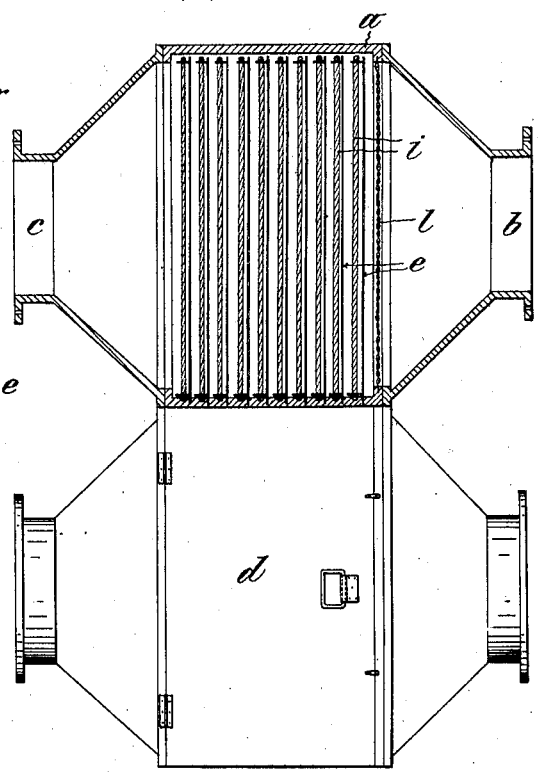

M. BRAUER.
AIR FILTER.
APPLICATION FILED AUG. 4, 1913.
1,094,521.
Patented Apr. 28, 1914.
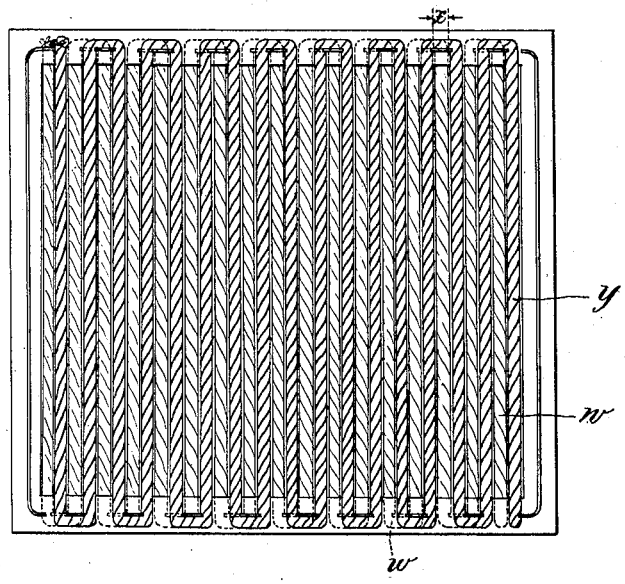
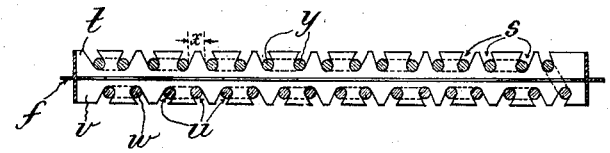

UNITED STATES PATENT OFFICE.

MAX BRAUER, OF BERLIN-WILMERSDORF, GERMANY, ASSIGNOR TO THE FIRM OF DR. HANS CRUSE & CO., OF BERLIN, GERMANY.

AIR-FILTER.

1,094,521.   Specification of Letters Patent.   Patented Apr. 28, 1914.

Application filed August 4, 1913. Serial No. 782,906.

*To all whom it may concern:*

Be it known that I, MAX BRAUER, a citizen of the Empire of Germany, residing at Kulmbacherstrasse 12, Berlin-Wilmersdorf, Germany, have invented certain new and useful Improvements in Air-Filters, of which the following is a specification.

My invention relates to improvements in air filters, and more particularly in air filters of the class in which the filtering elements are provided by ropes or cords having a fibrous or rough surface and disposed one beside the other at suitable distances apart. And the object of the improvements is to provide a filter of this class in which the dust is thoroughly separated from the air. With this object in view my invention consists in displacing corresponding cords or ropes of successive elements from each other in the direction of the path of the air, so that the currents of air after passing between adjacent ropes of one element strike against ropes or cords of the following element, so as to be deflected thereby and to get into thorough contact with the ropes or cords.

For the purpose of explaining the invention several examples embodying the same have been shown in the accompanying drawing, in which the same letters of reference have been used in all the views to indicate corresponding parts.

In said drawing Figure 1, is a perspective view of the filtering apparatus showing the casing of the filtering apparatus open and a part of the filtering elements in position and another part in position for being placed into the casing, Fig. 2, is a plan view partly in section of a filtering apparatus consisting of two casings located one above the other and each filled with a suitable number of filtering elements, Fig. 3, is a side elevation of the filtering apparatus shown in Fig. 2 partly in section, Fig. 4 is an enlarged end view of a filtering element, Fig. 5 is a plan view of a modification of the filtering element, Fig. 6 is an end view of Fig. 5.

Referring to the example illustrated in Figs. 1 to 4, the filter is made up of a plurality of members each of which consists of a casing $a$ of rectangular form. The casings are adapted to be filled with filtering elements $e$, for which purpose one of the walls can be removed or opened. In the example shown in Fig. 1 the side wall $d$ is adapted to be opened for which purpose it is hinged to the body of the casing $a$. At the inlet end the casing $a$ is provided with a metal screen $l$ to prevent larger bodies from getting access to the filtering elements. At the inlet and outlet the casing $a$ is provided with inlet and outlet studs $b$ and $c$ constructed in the form of funnels. In the example shown in Figs. 1 to 4 the filtering elements are constructed of rectangular frames made from iron bars $f$ of T-shaped cross-section, the web portions $g$ of two bars $o$ and $p$ located at opposite sides of the frame being provided with indentations $h$. In the latter a cord or rope $i$ is inserted which is passed over the opposing bars $o$ and $p$ of the frame in zig-zag. In the preferred form shown in the figures the indentations are made in such a way, that the parts $k$ which hold the rope or cord have a dovetailed or similar form, so that the rope can not slip off. The rope or cord $i$ has a rough or fibrous surface.

The rope or cord sections of adjacent filtering elements are displaced from each other in the direction of the longitudinal axis of the casing. This may be done in different ways. As shown it is done in such a way, that frames of the same construction can be used for all the filtering elements. For this purpose the ropes are passed over the frames in an unsymmetrical way, the frames having at one side spaces $q$ for the passage of air and at the opposite side ropes or cords $r$ which are directly in contact with the adjacent side bars of the frames. In the casing adjacent filtering elements are turned upside down relatively to each other, so that in one element the space $q$ is located at the right hand side and in the adjacent element at the left hand side. Thereby in successive elements the ropes are located in line with passages.

In the example illustrated in Figs. 5 and 6 each frame is provided with a double layer of ropes or cords, one being at the front side and the other one at the rear side of the frame. For convenience in the construction of the elements the frame bars are made from iron bars which have a web at opposite sides, each of the said webs being made with indentations for receiving the rope or cord. Preferably the ropes of the layers of each frame are displaced from each other in the manner described with reference to Figs. 1 to 4. Also in this case all the elements have the same construction, but the successive elements are not turned upside down relatively to each other. As shown the indentations *s* of the web *t* are displaced relatively to the indentations *u* of the web *v*, so that the ropes *w* of one layer cover the spaces *x* provided by the ropes *y* of the other layer. By providing similar frames of this construction the air must follow a zig-zag path through the filter. The opposite sides of the frame may be covered by a continuous rope.

While in describing the invention reference has been made to particular embodiments thereof, I wish it to be understood that my invention is not limited to the constructions shown in the drawings, and that various changes may be made in the general construction and arrangement of the parts without departing from the gist of my invention. For example it is not necessary to provide displaced ropes or cords in the manner described herein, and it is not necessary, to have the ropes of successive layers arranged parallel to each other, provided that the said ropes are adapted to deflect the air from the straight path or to force the particles thereof to get in contact with the ropes.

I claim herein as my invention:

1. In an apparatus for separating dust from gaseous fluids, the combination with a casing, of a plurality of filtering elements within said casing each formed of sets of spaced and adjacent ropes or cords, the ropes or cords of successive sets being displaced from each other transversely of the direction of the path of the fluid.

2. A filtering element, comprising a frame, and ropes or cords having a rough or fibrous surface secured to said frame in zig-zag on both sides thereof.

3. A filtering element, comprising a frame, and ropes or cords having a rough or fibrous surface secured to said frame in zig-zag on both sides thereof, the ropes of one side being displaced from the ropes of the other side.

4. A filtering element, comprising a frame constructed of iron bars having webs projecting to opposite sides of the plane of the frame and formed with indentations, and and ropes or cords having a rough or fibrous on both sides of the frame and passed in zig-zag over the area of the frame, the ropes of one side being displaced from those of the opposite side.

5. A filtering element, comprising a frame, and ropes or cords having a rough or fibrous surface secured to said frame and arranged in several layers.

In testimony whereof I affix my signature in presence of two witnesses.

MAX BRAUER.

Witnesses:
 Woldemar Haupt,
 Henry Hasper.